United States Patent
Chen et al.

(10) Patent No.: US 11,582,314 B1
(45) Date of Patent: Feb. 14, 2023

(54) METHOD FOR ASSISTING UNREGISTERED USER DEVICE TO ACCESS PRIVATE NETWORK SERVICE AND COMMUNICATION SYSTEM

(71) Applicant: Industrial Technology Research Institute, Hsinchu (TW)

(72) Inventors: Jian Cheng Chen, Taoyuan (TW); Tsun-Chieh Chiang, Changhua County (TW); Kuo-Wei Wen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/558,596

(22) Filed: Dec. 22, 2021

(30) Foreign Application Priority Data

Nov. 29, 2021 (TW) .................................. 110144440
Nov. 29, 2021 (TW) .................................. 110144441

(51) Int. Cl.
*H04L 67/141* (2022.01)
*H04L 67/306* (2022.01)
(Continued)

(52) U.S. Cl.
CPC .......... *H04L 67/141* (2013.01); *H04L 65/403* (2013.01); *H04L 67/10* (2013.01); *H04L 67/306* (2013.01)

(58) Field of Classification Search
None
See application file for complete search history.

(56) References Cited

U.S. PATENT DOCUMENTS

| 8,538,374 | B1 | 9/2013 | Haimo et al. |
| 10,285,155 | B1 | 5/2019 | Dodd-Noble et al. |
| 10,455,536 | B1 * | 10/2019 | Khawand ............. H04B 1/3816 |
| 10,506,506 | B2 | 12/2019 | Qiao et al. |

(Continued)

FOREIGN PATENT DOCUMENTS

| CA | 3014115 A1 * | 10/2018 | ......... H04L 41/0806 |
| CN | 110996303 | 11/2020 | |

(Continued)

OTHER PUBLICATIONS

Shih-Chun Huang et al., "Application-Aware Traffic Redirection: A Mobile Edge Computing Implementation Toward Future 5G Networks", 2017 IEEE 7th International Symposium on Cloud and Service Computing, Nov. 2017, pp. 17-23.

(Continued)

*Primary Examiner* — Uzma Alam
(74) *Attorney, Agent, or Firm* — JCIPRNET (57) ABSTRACT

The disclosure provides a method for assisting an unregistered user device to access private network services and a communication system. The method includes steps as follows. A request to access a private service of a private network is sent by a user device. In response to determining that the user device not registered on the private network wants to access the private service, the user device is assisted to obtain a temporary user profile by a mobile edge computing server through an emergency type attachment procedure. In response to determining that the user device is registered on the private network through the emergency type attachment procedure, a regular attachment procedure is executed by the user device based on the temporary user profile. In response to determining that the user device executes the regular attachment procedure, the mobile edge (Continued)

computing server provides the user device with the private service.

24 Claims, 6 Drawing Sheets

(51) Int. Cl.
*H04L 67/10* (2022.01)
*H04L 65/403* (2022.01)

(56) References Cited

U.S. PATENT DOCUMENTS

| | | | |
|---|---|---|---|
| 10,666,492 B1 * | 5/2020 | Wieland | H04L 67/306 |
| 10,674,319 B1 | 6/2020 | Chandra Mondal et al. | |
| 10,972,575 B2 | 4/2021 | Li et al. | |
| 11,184,647 B1 | 11/2021 | Khalid et al. | |
| 2011/0267984 A1 * | 11/2011 | Arora | H04W 76/50 370/259 |
| 2014/0150070 A1 | 5/2014 | Peterson | |
| 2019/0037516 A1 * | 1/2019 | Kim | H04W 60/005 |
| 2020/0374143 A1 | 11/2020 | Mukherjee et al. | |
| 2022/0156577 A1 * | 5/2022 | Jha | G06K 9/623 |
| 2022/0164484 A1 * | 5/2022 | Low | G06F 21/604 |

FOREIGN PATENT DOCUMENTS

| | | | | |
|---|---|---|---|---|
| JP | 2017-516201 A | * | 6/2017 | |
| JP | 2017516201 A | * | 6/2017 | |
| TW | 202021384 | | 6/2020 | |
| TW | 202121910 | | 6/2021 | |
| WO | WO-2020231120 A1 | * | 11/2020 | H04L 67/16 |

OTHER PUBLICATIONS

E. Schiller et al., "CDS-MEC: NFV/SDN-based Application Management for MEC in 5G Systems", Computer Networks, Jan. 9, 2018, pp. 1-20.

Jianbing Ni et al., "Efficient and Secure Service-Oriented Authentication Supporting Network Slicing for 5G-Enabled IoT", IEEE Journal on Selected Areas in Communications, Mar. 12, 2018, pp. 644-657.

Cesar A. Garcia-Perez et al., "Enabling low latency services in standard LTE networks", 2016 IEEE 1st International Workshops on Foundations and Applications of Self-*Systems, Sep. 2016, pp. 248-255.

Johnson Opadere et al., "Energy-Efficient Virtual Radio Access Networks for Multi-Operators Cooperative Cellular Networks", IEEE Transactions on Green Communications and Networking, May 13, 2019, pp. 1-12.

Ruben Solozabal et al., "Exploitation of Mobile Edge Computing in 5G Distributed Mission-Critical Push-to-Talk Service Deployment", IEEE Access, Jun. 20, 2018, pp. 1-11.

Syed Husain et al., "Mobile edge computing with network resource slicing for Internet-of-Things", 2018 IEEE 4th World Forum on Internet of Things (WF-IoT), May 7, 2018, pp. 1-6.

Evelina Pencheva et al., "Open Access to Intersystem Handover Control Using Multi-access Edge Computing", 2018 International Symposium on Networks, Computers and Communications (ISNCC), Nov. 12, 2018, pp. 1-7.

Hye Rim Cheon et al., "Traffic Offloading Algorithm Using Social Context in MEC Environment", The Journal of Korean Institute of Communications and Information Sciences, with English abstract, Feb. 28, 2017, pp. 1-10.

"Office Action of Taiwan Counterpart Application", dated Sep. 5, 2022, p. 1-p. 7.

* cited by examiner

METHOD FOR ASSISTING UNREGISTERED USER DEVICE TO ACCESS PRIVATE NETWORK SERVICE AND COMMUNICATION SYSTEM

CROSS-REFERENCE TO RELATED APPLICATION

This application claims the priority benefits of Taiwan application serial no. 110144441, filed on Nov. 29, 2021 and Taiwan application serial no. 110144440, filed on Nov. 29, 2021. The entirety of each of the above-mentioned patent applications is hereby incorporated by reference herein and made a part of this specification.

TECHNOLOGY FIELD

The disclosure relates to a technology for accessing private network services, and relates to a method for assisting an unregistered user device to access a private network service and a communication system.

BACKGROUND

Figure 1A:
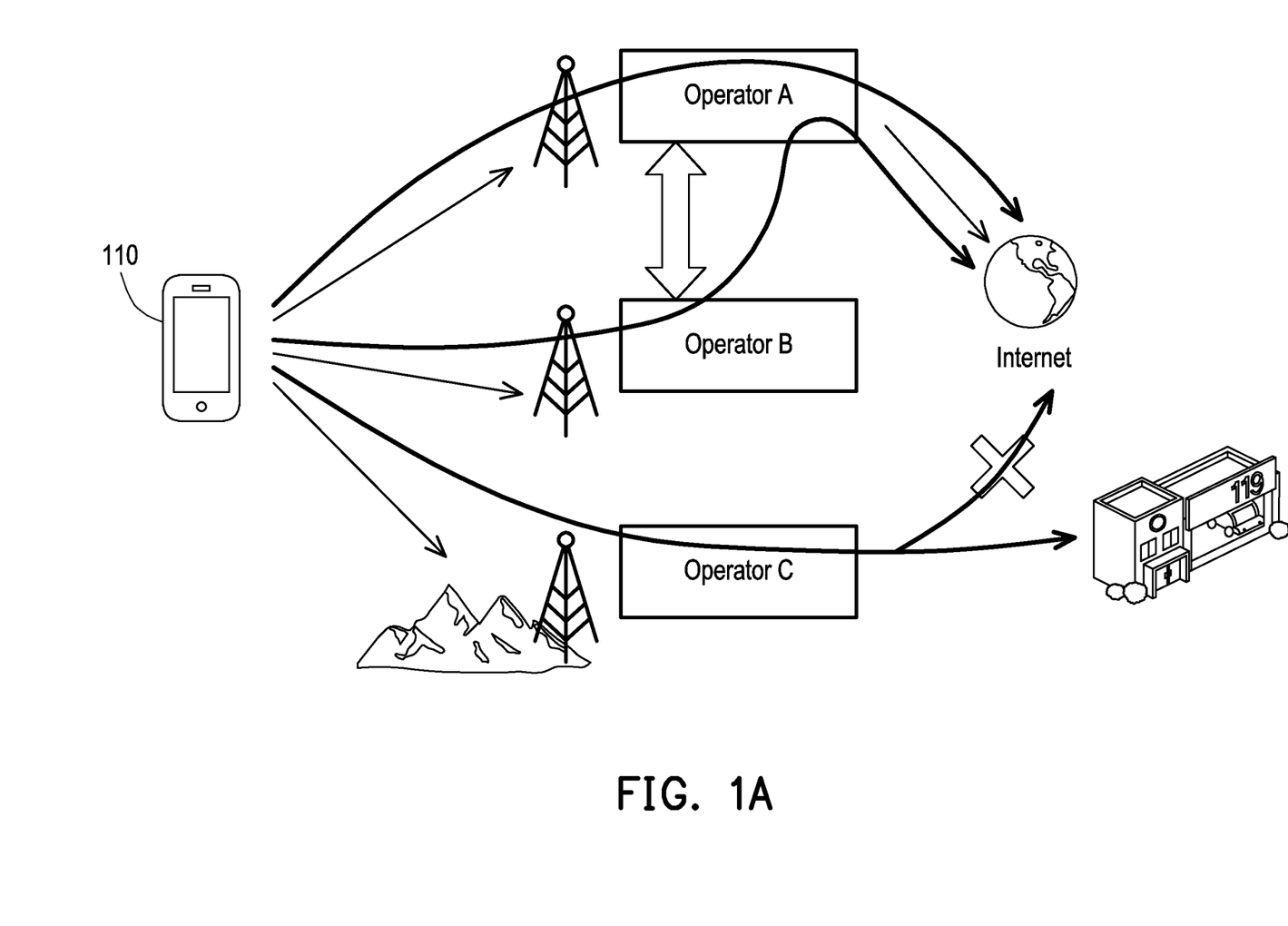
FIG. 1A is a schematic view of a conventional user device accessing the Internet.

Referring to FIG. 1A, FIG. 1 is a schematic view of a conventional user device accessing the Internet. In FIG. 1A, for example, a user device 110 is a registered/authorized user of an operator A but not a registered/authorized user of an operator B and an operator C. In this case, when the user device 110 is located within the service range of the operator A, the user device 110 can access the Internet through the operator A. In addition, when the user device 110 is located within the service range of the operator B, if the user device 110 is authorized to use the roaming service through the operator B, the user device 110 can access the Internet through the operator B and the operator A.

However, if the user device 110 uses the telecommunication service through the operator C without authorization, the user device 110 can only execute functions such as initiating an emergency call through the operator C but cannot access the Internet through the operator C.

Figure 1B:
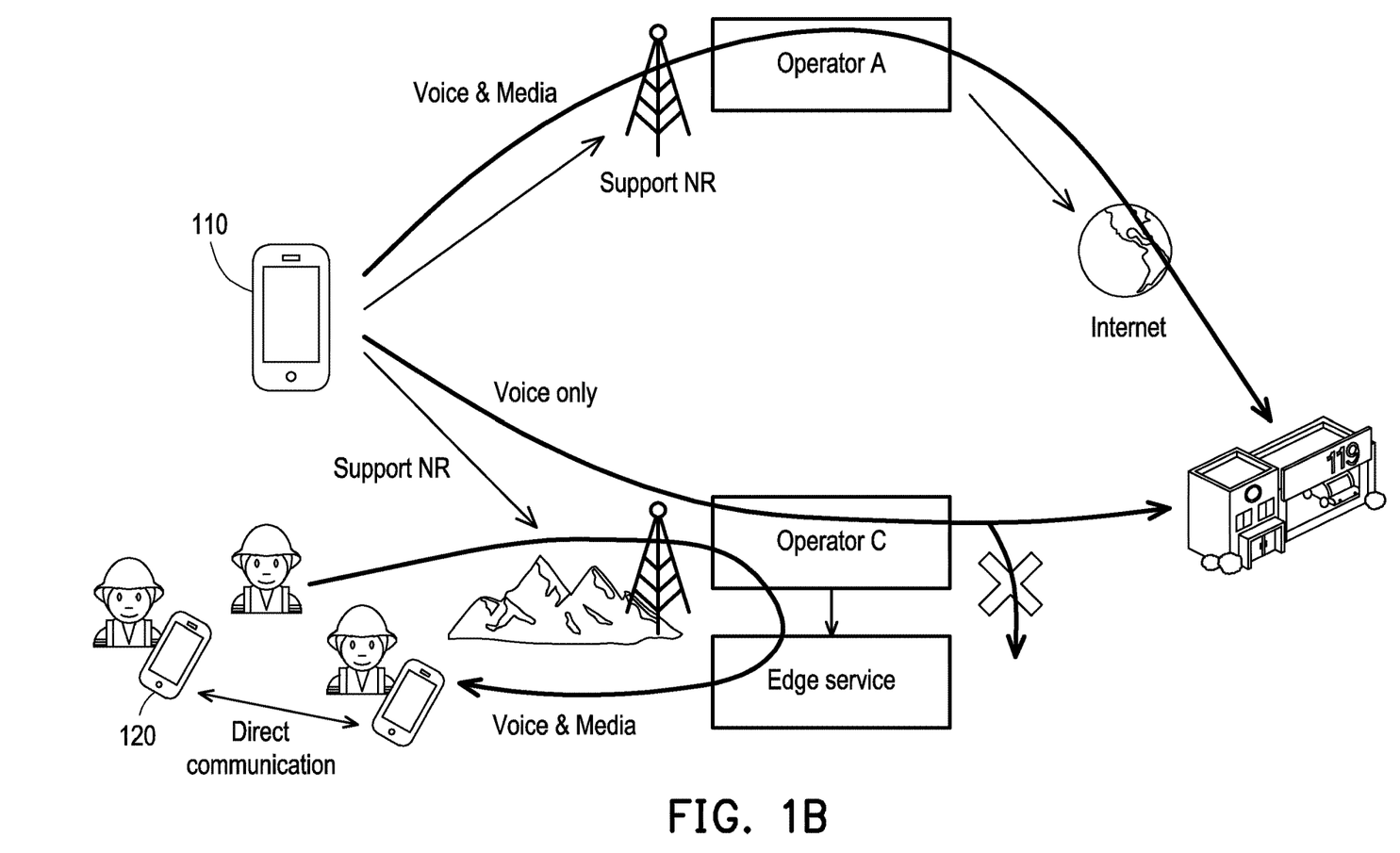
FIG. 1B is another schematic view of the conventional user device accessing the Internet as shown in FIG. 1A.

Referring to FIG. 1B, FIG. 1B is another schematic view of the conventional user device accessing the Internet as shown in FIG. 1A. In FIG. 1B, it is assumed that the operator A supports new radio (NR), and the user device 110 can use the service such as VoNR through the operator A. However, since the user device 110 is not a registered user of the operator C (e.g., it may maintain a private network), even if the operator C can provide the registered users (e.g., a user device 120) with services such as VoNR, the user device 110 yet can use the emergency call service of the operator C only. In this case, even if registered users of the operator C can communicate directly with one another through the edge service provided by the operator C, the user device 110 cannot directly communicate with registered users (e.g., the user device 120) of operator C end-to-end.

SUMMARY

The disclosure provides a method for assisting an unregistered user device to access a private network service, adapted for a communication system using a mobile edge computing. The method includes steps as follows. A user device sends a request to access a private service of a private network, and the user device is not registered on the private network. In response to determining that the user device not registered on the private network wants to access the private service, a mobile edge computing (MEC) server assists the user device to obtain a temporary user profile through an emergency type attachment procedure to be registered on the private network based on the temporary user profile. In response to determining that the user device is registered on the private network through the emergency type attachment procedure, the user device executes a regular attachment procedure based on the temporary user profile, and in response to determining that the user device executes the regular attachment procedure, the mobile edge computing server provides the user device with the private service.

The disclosure provides a communication system for assisting an unregistered user device to access a private network service. The communication system includes a user device and a mobile edge computing (MEC) server. The user device sends a request to access a private service of a private network, and the user device is not registered on the private network. In response to the mobile edge computing server determining that the user device not registered on the private network wants to access the private service, the mobile edge computing server assists the user device to obtain a temporary user profile through an emergency type attachment procedure to be registered on the private network based on the temporary user profile. In response to determining that the user device is registered on the private network through the emergency type attachment procedure, the user device executes a regular attachment procedure based on the temporary user profile, and in response to determining that the user device executes the regular attachment procedure, the mobile edge computing server provides the user device with the private service.

DESCRIPTION OF THE EMBODIMENTS

Figure 2:
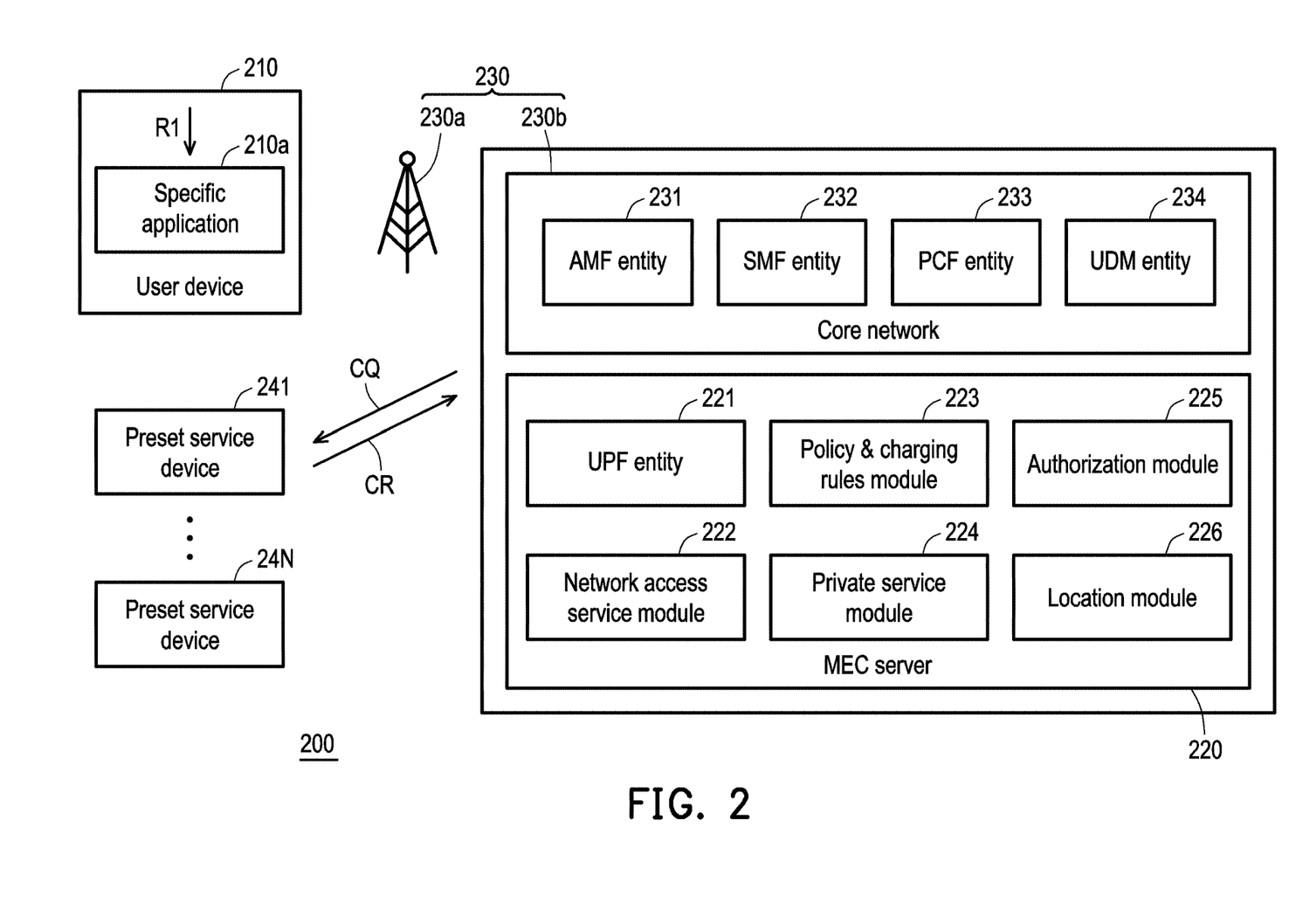
FIG. 2 is a schematic view of a communication system according to an embodiment of the disclosure.

Referring to FIG. 2, FIG. 2 is a schematic view of a communication system according to an embodiment of the disclosure. As shown in FIG. 2, a communication system 200 includes a user device 210, a mobile edge computing (MEC) server 220, and a private network 230.

In different embodiments, for example, the user device 210 is various smart devices/computer devices with communication functions, but the disclosure is not limited thereto. In FIG. 2, the private network 230 may include a base station 230a and a core network 230b. In an embodiment, the private network 230 is a private network operated based on the 5th generation communication system (hereinafter referred to as 5G), for example. In this case, for example, the base station 230a is commonly known as gNB, and the core network 230b is commonly known as 5G core (5GC), for example, but the disclosure is not limited thereto.

In the embodiment of the disclosure, the core network 230b may include an access and mobility management function (AMF) entity 231, a session management function (SMF) entity 232, a policy control function (PCF) entity 233, and a unified data management (UDM) entity 234. Moreover, for the individual features/functions, refer to the relevant 5G specifications, which are not repeated herein.

In addition, the MEC server 220 may include a user plane function (UPF) entity 221, a network access service module 222, a policy & charging rules module 223, a private service module 224, an authorization module 225, and a location module 226.

In different embodiments, the MEC server 220 and the core network 230b may be implemented as devices separated from one another or may be implemented as different modules integrated in the same device, but the disclosure is not limited thereto.

In the embodiment of the disclosure, for user devices that have been registered on the private network 230, the MEC server 220 may provide the user devices with private services (e.g., end-to-end call services between registered user devices) through the private service module 224.

For example, assuming that the service range of the private network 230 corresponds to a certain amusement park, in this case, the communication devices held by the staff of the amusement park may be planned as registered user devices of the private network 230.

Therefore, the staff may have end-to-end sessions with one another through the private service module 224 of the MEC server 220 with their own communication devices, but the disclosure is not limited thereto. In some embodiments, for example, the staff may insert SIM cards registered on the private network 230 into their communication devices, which therefore can become registered user devices of the private network 230, but the disclosure is not limited thereto.

In the embodiment of the disclosure, assuming that the user device 210 (e.g., a communication device held by a visitor) is not registered on the private network 230, the MEC server 220 may not directly provide the user device with the private service (e.g., establishing an end-to-end session between the user device 210 and the communication devices of the staff) through the private service module 224.

In view of this, the MEC server 220 of the disclosure can solve the technical problem by executing the method proposed by the disclosure, which are illustrated in detail in the subsequent paragraphs.

Figure 3:
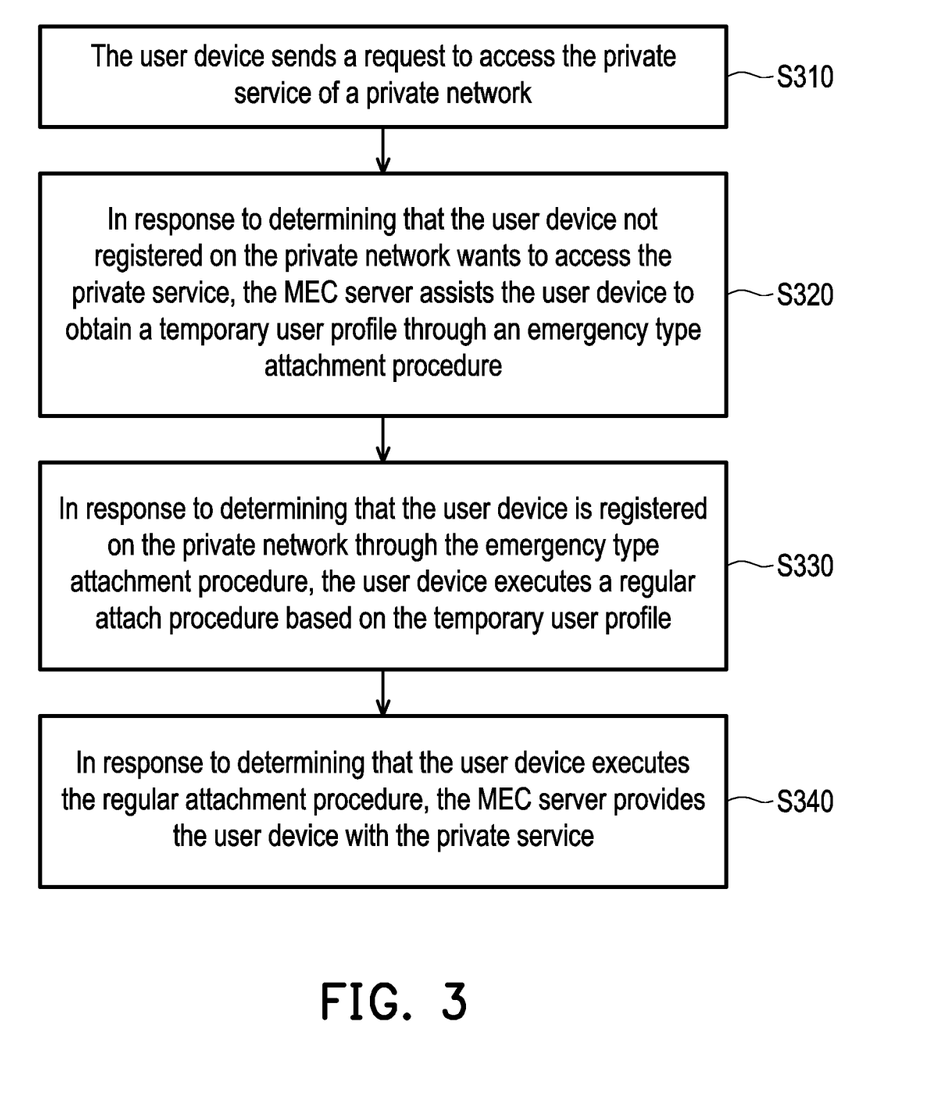
FIG. 3 is a flowchart illustrating a method for assisting an unregistered user device to access a private network service according to an embodiment of the disclosure.
Figure 4:
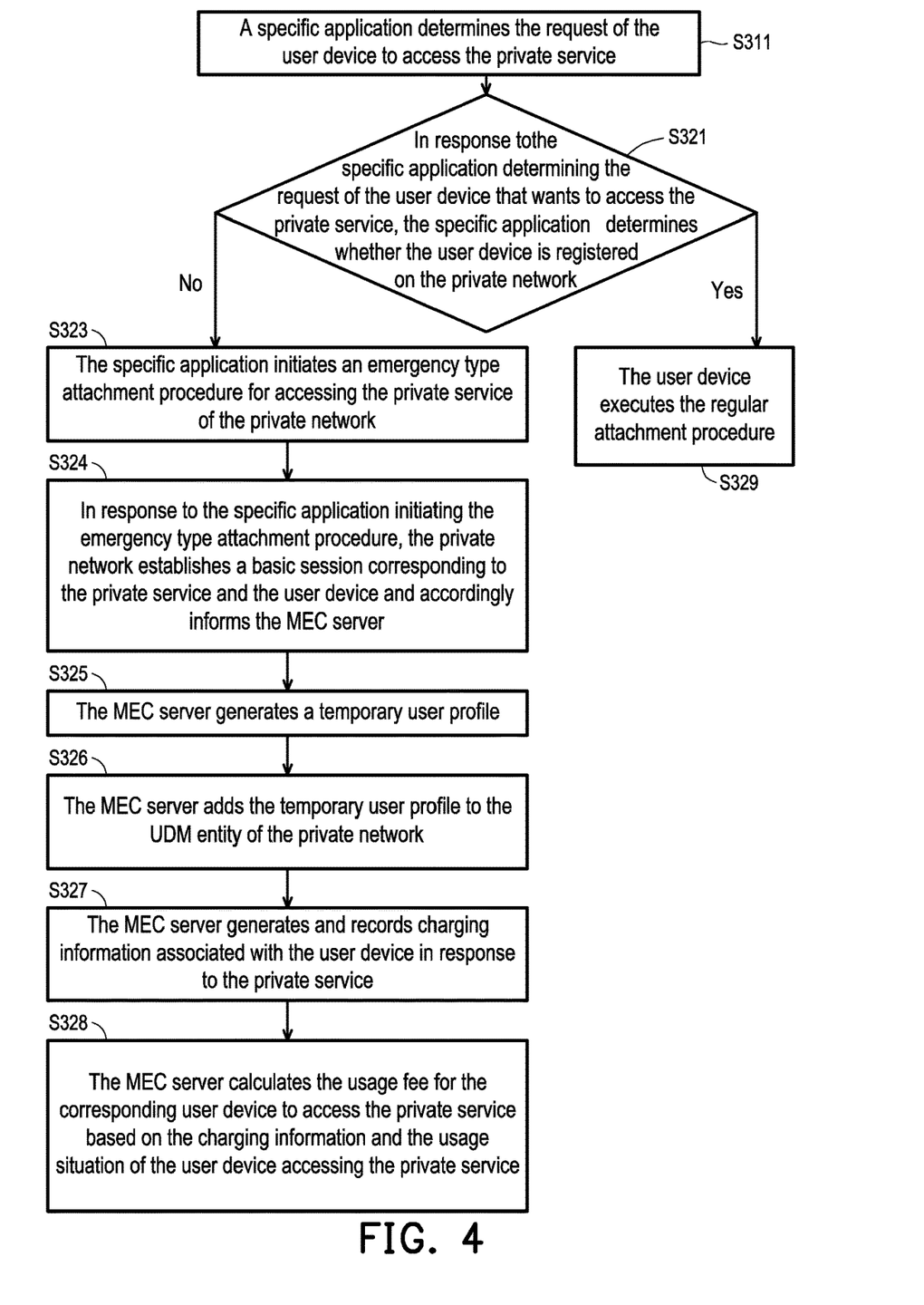
FIG. 4 is a flowchart illustrating some steps in FIG. 3 in detail.

Referring to FIG. 3, FIG. 3 is a flowchart illustrating a method for assisting an unregistered user device to access a private network service according to an embodiment of the disclosure. The method of the embodiment can be executed by the MEC server 220 of FIG. 2 assisting the user device 210 not registered on the private network 230. With reference to the components shown in FIG. 2, the details of each step in FIG. 3 are illustrated in the subsequent paragraphs. In addition, for clarification of the concept of FIG. 3, with reference to FIG. 4 as supplement to the explanation, FIG. 4 is a flowchart illustrating some steps in FIG. 3 in detail.

First, in step S310, the user device 210 sends a request R1 to access the private service of the private network 230.

In an embodiment, a specific application 210a corresponding to the private network 230 may be installed in the user device 210. In an embodiment, after the visitor holding the user device 210 enters the amusement park, the specific application 210a corresponding to the amusement park may be downloaded and installed in the user device 210, so that the user device 210 may access the private service when being unregistered on the private network 230. In an embodiment, when the user of the user device 210 wants to access the private service, the user device 210 can be triggered to send the request R1 through a specific method.

In an embodiment, a button corresponding to the private service may be disposed on the specific application 210a. When the visitor wants to use the private service, the button can be triggered accordingly to trigger the user device 210 to send the request R1.

In an embodiment, after step S310, the specific application 210a can execute step S311 of FIG. 4 to determine the request R1 of the user device 210 to access the private service. Then, in step S321, in response to the specific application 210a determining that the request R1 of the user device 210 that wants to access the private service, the specific application 210a determines whether the user device 210 is registered on the private network 230.

Since the user device 210 is assumed to be unregistered on the private network 230, the specific application 210a may proceed to execute step S323 after step S321 to initiate an emergency type attachment procedure for accessing the private service to the private network 230. In other embodiments, if the user device 210 has been registered on the private network 230, the user device 210 may execute step S329 after step S321 to execute the regular attachment procedure.

In step S324, in response to the emergency type attachment procedure initiated by the specific application 210a, the private network 230 establishes a basic session corresponding to the private service and the user device 210 and accordingly informs the MEC server 220.

In an embodiment, the AMF entity 231 may request the SMF entity 232 to establish a basic session corresponding to the private service and the user device 210 in response to the emergency type attachment procedure initiated on the user device 210 and accordingly inform the UPF entity 221.

In an embodiment, before establishing the basic session, the location module 226 may first determine whether the user device 210 is located within the service range (e.g., the amusement park) of the private network 230. If so, the SMF entity 232 may accordingly establish a basic session corresponding to the private service and the user device 210, and in contrast, the basic session corresponding to the private service and the user device 210 may not be established.

After the basic session is established, the UPF entity 221 may accordingly inform the network access service module 222 that the basic session corresponding to the private service and the user device 210 has been established.

In an embodiment, in response to informing the network access service module 222 that the basic session corresponding to the private service and the user device 210 has been established, the MEC server 220 may determine that the user device 210 not registered on the private network 230 wants to access the private service, and then step S320 of FIG. 3 is executed accordingly.

In step S320, in response to determining that the user device 210 not registered on the private network 230 wants to access the private service, the MEC server 220 assists the user device 210 to obtain a temporary user profile through the emergency type attachment procedure.

In an embodiment, the MEC server 220 may implement step S320 through step S325 and step S326 in FIG. 4. In step S325, the network access service module 222 of the MEC server 220 may request the authorization module 225 to generate a temporary user profile, and in step S326, the authorization module 225 adds the temporary user profile to the UDM entity 234.

In an embodiment, the authorization module 225 may generate the temporary user profile through, for example, an embedded SIM tool (an eSIM tool), but the disclosure is not limited thereto.

After the authorization module 225 generates the temporary user profile, the temporary user profile is stored in the UDM entity 234 by a 3GPP authentication, authorization, accounting (AAA) server, but the disclosure is not limited thereto.

In an embodiment, if the user device 210 wants to use a private service that charges, the MEC server 220 may further execute step S327 and step S328. In step S327, the policy & charging rules module 223 of the MEC server 220 may generate and record the charging information associated with the user device 210 in response to the private service. In different embodiments, the charging information may include, for example, pay-per-use, charge based on, rate, etc., but it may not be limited thereto. In an embodiment, subsequently if the user device 210 uses the private service, in step S328, the policy & charging rules module 223 of the MEC server 220 may calculate the usage fee for the corresponding user device 210 to access the private service based on the charging information and the usage situation of the user device 210 accessing the private service, but the disclosure is not limited thereto.

In an embodiment, after the authorization module 225 stores the temporary user profile in the UDM entity 234, the network access service module 222 may send the temporary user profile to the user device 210. Correspondingly, after the user device 210 receives the temporary user profile, the user device 210 may determine that the user device 210 has been registered on the private network 230 through the emergency type attachment procedure, and step S330 is executed accordingly.

In step S330, in response to determining that the user device 210 is registered on the private network 230 through the emergency type attachment procedure, the user device 210 executes the regular attachment procedure based on the temporary user profile to be registered on the private network 230. In some embodiments, for the details of the regular attachment procedure, refer to related communication system specifications, which are not repeated herein.

Next, in step S340, in response to determining that the user device 210 executes the regular attachment procedure, the MEC server 220 provides the user device 210 with a private service.

In an embodiment, it is assumed that the private service requested by the user device 210 is a multimedia streaming service (e.g., it is used to watch a multimedia streaming provided by a certain facility/venue in an amusement park). In this case, the private service module 224 may send the multimedia stream of the multimedia streaming service to the user device 210.

In some embodiments, the MEC server 220 may also charge the user device 210 a usage fee for using the private service based on the charging information and the usage situation of the user device 210 using the private service. For example, assuming that the charging information indicates that the user device 210 that uses the private service needs to be charged based on time, the MEC server 220 may calculate the charge to the user device 210 based on the time that the user device 210 spends on using the private service. In another example, assuming that the charging information indicates that the user device 210 that uses the private service needs to be charged pay-per-use, the MEC server 220 may calculate the charge to the user device 210 based on the number of times the user device 210 uses the private service, but the disclosure is not limited thereto.

In an embodiment, it is assumed that the private service requested by the user device 210 is an end-to-end session with one of the preset service devices 241-24N registered on the private network 230. In this case, the MEC server 220 may provide the private service through the method shown in FIG. 5, for example.

Figure 5:
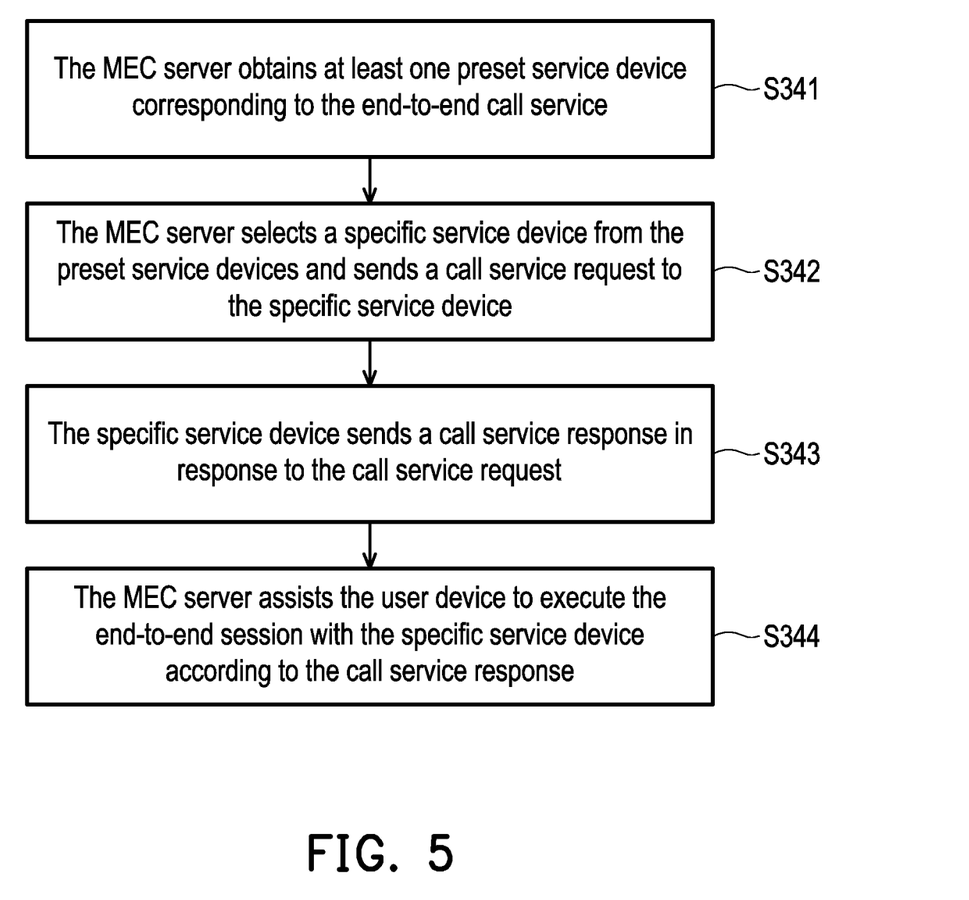
FIG. 5 is a flowchart illustrating the provision of end-to-end call services according to an embodiment of the disclosure.

Referring to FIG. 5, FIG. 5 is a flowchart illustrating the provision of end-to-end call services according to an embodiment of the disclosure. First, in step S341, the private service module 224 of the MEC server 220 may obtain the preset service devices 241-24N corresponding to the end-to-end call services, and each of the preset service devices 241-24N has been registered on the private network 230. Next, in step S342, the private service module 224 of the MEC server 220 may select a specific service device from the preset service devices 241-24N and request the PCF entity 233 of the private network 230 to send a call service request CQ to the specific service device through the policy & charging rules module 223.

In an embodiment, after obtaining the location of the user device 210 and the location of each of the preset service devices 241-24N from the location module 226, the private service module 224 may find the one closest to the user device 210 from the preset service devices 241-24N to serve as the specific service device. In other embodiments, the private service module 224 may also select a specific service device from the preset service devices 241-24N based on other principles. For example, the private service module 224 may also randomly select one from the preset service devices 241-24N as the specific service device, but the disclosure is not limited thereto.

For facilitating the description, in the subsequent paragraphs, it is assumed that the preset service device 241 is the specific service device selected by the private service module 224 and may be used for end-to-end sessions. In this case, the PCF entity 233 may send a call service request CQ to the preset service device 241 according to the teaching. In an embodiment, the MEC server 220 may send the call service request CQ to the private network 230, and the private network 230 may send the call service request CQ to the specific service device.

Correspondingly, in step S343, the specific service device (i.e., the preset service device 241) may send a call service response CR to the PCF entity 233 in response to the call service request CQ, and the PCF entity 233 may inform the policy & charging rules module 223.

In an embodiment, in response to the specific service device sending the call service response CR, the MEC server 220 may confirm that the specific service device has entered a call waiting state through the private network 230.

Then, in step S344, the policy & charging rules module 223 of the MEC server 220 may trigger the private service module 224 to assist the user device 210 in executing the end-to-end session with the specific service device (i.e., the preset service device 241) according to the call service response CR.

In an embodiment, it is assumed that the end-to-end call service is an emergency call service. Therefore, when a visitor holding the user device 210 wants to use the emergency call service of the amusement park to contact related personnel in the amusement park, the corresponding button may be triggered in the specific application 210*a*.

Then, the specific application 210*a* may initiate an emergency type attachment procedure for accessing the emergency call service to the private network 230 because it is determined that the user device 210 is not registered on the private network 230.

Correspondingly, the MEC server 230 may assist the user device 210 to be registered on the private network 230 through the taught mechanism.

In an embodiment, the MEC server 220 may first acquire which amusement park staff correspond to the emergency call services (i.e., medical staff, etc.), and then the user devices held by the staff are regarded as the preset service devices. Then, the MEC server 230 may find the one closest to the user device 210 from the preset service devices to serve as the specific service device and then establish an end-to-end session between the user device 210 and the specific service device. Accordingly, visitors who need an emergency call service can find the nearest medical staff to assist with the emergency through the end-to-end call service, but the disclosure is not limited thereto.

In summary, the embodiment of the disclosure allows the MEC server to assist user devices not registered on the private network to be registered on the private network through the emergency type attachment procedure. Accordingly, the MEC server may be allowed to provide the user device with the private service (e.g., the end-to-end call service) provided by the MEC server in the private network.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A method for assisting an unregistered user device to access a private network service, adapted for a communication system using a mobile edge computing (MEC), wherein the method comprises:
   sending a request to access a private service of a private network by a user device, wherein the user device is not registered on the private network, wherein the private service comprises a multimedia streaming service;
   in response to determining that the user device not registered on the private network wants to access the private service, by a mobile edge computing (MEC) server, assisting the user device to obtain a temporary user profile through an emergency type attachment procedure so as to be registered on the private network based on the temporary user profile;
   in response to determining that the user device is registered on the private network through the emergency type attachment procedure, by the user device, executing a regular attachment procedure based on the temporary user profile; and
   in response to determining that the user device executes the regular attachment procedure, by the mobile edge computing server, providing the user device with the private service, comprising:
      sending a multimedia stream of the multimedia stream service to the user device by the mobile edge computing server.

2. The method for assisting the unregistered user device to access the private network service according to claim 1, wherein the user device comprises a specific application corresponding to the private network, and the method further comprises:
   by the specific application, determining the request of the user device to access the private service;
   in response to the specific application determining the request of the user device that wants to access the private service, determining whether the user device is registered on the private network by the specific application; and
   in response to determining that the user device is not registered on the private network, by the specific application, initiating the emergency type attachment procedure for accessing the private service to the private network.

3. The method for assisting the unregistered user device to access the private network service according to claim 2, wherein in response to the emergency type attachment procedure initiated by the specific application, the private network establishes a basic session corresponding to the private service and the user device and accordingly informs the mobile edge computing server.

4. The method for assisting the unregistered user device to access the private network service according to claim 3, wherein:
   in response to the mobile edge computing (MEC) server being informed that the basic session corresponding to the private service and the user device has been established, the mobile edge computing server generates the temporary user profile and adds the temporary user profile to a unified data management (UDM) entity of the private network; and
   the mobile edge computing (MEC) server sends the temporary user profile to the specific application of the user device.

5. The method for assisting the unregistered user device to access the private network service according to claim 4, wherein the user device executes the regular attachment procedure and logs in to the private network based on the temporary user profile.

6. The method for assisting the unregistered user device to access the private network service according to claim 4, further comprising:
   by the mobile edge computing server, in response to the private service, generating and recording charging information associated with the user device.

7. The method for assisting the unregistered user device to access the private network service according to claim 6, further comprising:
   calculating a usage fee corresponding to the user device accessing the private service based on the charging information and a usage situation of the user device accessing the private service.

8. The method for assisting the unregistered user device to access the private network service according to claim 3, wherein before the step in which the private network establishes the basic session corresponding to the private service and the user device, the method further comprises:
   by the mobile edge computing server, determining whether the user device is located within a service range of the private network;
   in response to the user device being located within the service range of the private network, by the private network, establishing the basic session corresponding to the private service and the user device; and
   in response to the user device being not located within the service range of the private network, by the private network, not establishing the basic session corresponding to the private service and the user device and ignores the user device.

9. The method for assisting the unregistered user device to access the private network service according to claim 1, wherein the private service further comprises an end-to-end call service, and the step of providing the user device with the private service by the mobile edge computing server further comprises:
 obtaining at least one preset service device corresponding to the end-to-end call service by the mobile edge computing server, wherein each of the preset service devices has been registered on the private network;
 selecting a specific service device from the at least one preset service device and sending a call service request to the specific service device by the mobile edge computing server;
 in response to the call service request, by the specific service device, sending a call service response; and
 assisting the user device to execute an end-to-end session with the specific service device by the mobile edge computing server according to the call service response.

10. The method for assisting the unregistered user device to access the private network service according to claim 9, wherein the step of sending a call service response by the specific service device comprises:
 by the mobile edge computing server, sending the call service request to the private network, wherein the private network sends the call service request to the specific service device.

11. The method for assisting the unregistered user device to access the private network service according to claim 9, further comprising:
 in response to the specific service device sending the call service response, by the mobile edge computing server, through the private network, confirming that the specific service device has entered a call waiting state.

12. The method for assisting the unregistered user device to access the private network service according to claim 9, wherein the specific service device is closest to the user device among the at least one preset service device.

13. A communication system for assisting an unregistered user device to access a private network service, comprising:
 a user device; and
 a mobile edge computing (MEC) server, wherein
 the user device sends a request to access a private service of a private network, and the user device is not registered on the private network, wherein the private service comprises a multimedia streaming service;
 in response to the mobile edge computing server determining that the user device not registered on the private network wants to access the private service, the mobile edge computing server assists the user device to obtain a temporary user profile through an emergency type attachment procedure to be registered on the private network based on the temporary user profile;
 in response to determining that the user device is registered on the private network through the emergency type attachment procedure, the user device executes a regular attachment procedure based on the temporary user profile; and
 in response to determining that the user device executes the regular attachment procedure, the mobile edge computing server provides the user device with the private service, comprising:
  sending a multimedia stream of the multimedia stream service to the user device through a private service module corresponding to the multimedia stream service.

14. The communication system for assisting the unregistered user device to access the private network service according to claim 13, wherein the user device comprises a specific application corresponding to the private network, wherein
 the specific application determines the request of the user device to access the private service;
 in response to the specific application determining the request of the user device that wants to access the private service, the specific application determines whether the user device is registered on the private network; and
 in response to determining that the user device is not registered on the private network, the specific application initiates the emergency type attachment procedure for accessing the private service to the private network.

15. The communication system for assisting the unregistered user device to access the private network service according to claim 14, further comprising the private network, wherein the private network comprises an access and mobility management function (AMF) entity and a session management function (SMF) entity, wherein the access and mobility management function entity requests the session management function entity to establish a basic session corresponding to the private service and the user device in response to the emergency type attachment procedure initiated by the user device and accordingly informs a user plane function (UPF) entity of the mobile edge computing server.

16. The communication system for assisting the unregistered user device to access the private network service according to claim 13, wherein the mobile edge computing server is configured to:
 in response to a network access service module of the mobile edge computing server being informed that a basic session corresponding to the private service and the user device has been established, determine that the user device not registered on the private network wants to access the private service;
 through the network access service module, request an authorization module of the mobile edge computing server to generate a temporary user profile, wherein the temporary user profile is added to a unified data management (UDM) entity of the private network through authorization module; and
 send the temporary user profile to the specific application of the user device through the network access service module.

17. The communication system for assisting the unregistered user device to access the private network service according to claim 16, wherein the user device executes the regular attachment procedure and logs in to the private network according to the temporary user profile.

18. The communication system for assisting the unregistered user device to access the private network service according to claim 16, wherein the mobile edge computing server is further configured to:
 by a policy & charging rules module of the mobile edge computing server, generate and record charging information associated with the user device in response to the private service.

19. The communication system for assisting the unregistered user device to access the private network service according to claim 18, wherein the mobile edge computing server is further configured to:
 charge the user device a usage fee for using the private service based on the charging information and a usage situation of the user device using the private service.

20. The communication system for assisting the unregistered user device to access the private network service according to claim 15, wherein before the private network establishes the basic session corresponding to the private service and the user device, the mobile edge computing server is further configured to use a location module to determine whether the user device is located within a service range of the private network;

in response to the location module determining that the user device is located within the service range of the private network, the private network establishes the basic session corresponding to the private service and the user device;

in response to the location module determining that the user device is not located within the service range of the private network, the private network does not establish the basic session corresponding to the private service and the user device and ignores the user device.

21. A communication system for assisting an unregistered user device to access a private network service, comprising:

a user device; and a mobile edge computing (MEC) server, wherein the user device sends a request to access a private service of a private network, and the user device is not registered on the private network, wherein the private service comprises an end-to-end call service;

in response to the mobile edge computing server determining that the user device not registered on the private network wants to access the private service, the mobile edge computing server assists the user device to obtain a temporary user profile through an emergency type attachment procedure to be registered on the private network based on the temporary user profile;

in response to determining that the user device is registered on the private network through the emergency type attachment procedure, the user device executes a regular attachment procedure based on the temporary user profile; and in response to determining that the user device executes the regular attachment procedure, the mobile edge computing server provides the user device with the private service, wherein the mobile edge computing server obtains at least one preset service device corresponding to the end-to-end call service through a private service module corresponding to the end-to-end call service, wherein each of the preset service devices has been registered on the private network;

the mobile edge computing server selects a specific service device from the at least one preset service device through the private service module and requests a policy control function (PCF) entity of the private network to send a call service request to the specific service device through a policy & charging rules module of the mobile edge computing server;

in response to the call service request, the specific service device sends a call service response; and in response to the call service response, the mobile edge computing server triggers the private service module through the policy & charging rules module to assist the user device in executing an end-to-end session with the specific service device.

22. The communication system for assisting the unregistered user device to access the private network service according to claim 21, wherein the mobile edge computing server sends the call service request to the private network, and the private network sends the call service request to the specific service device.

23. The communication system for assisting the unregistered user device to access the private network service according to claim 21, wherein in response to the specific service device sending the call service response, through the private network, the mobile edge computing server confirms that the specific service device has entered a call waiting state.

24. The communication system for assisting the unregistered user device to access the private network service according to claim 21, wherein the specific service device is closest to the user device among the at least one preset service device.

\* \* \* \* \*